United States Patent [19]

Giesbert et al.

[11] 4,241,866
[45] Dec. 30, 1980

[54] METHOD OF GENTLY CONTROLLING BRAKING OF A CENTRIFUGE, AND BRAKING SYSTEM

[75] Inventors: Frank Giesbert; Roland Kuhnert, both of Osterode, Fed. Rep. of Germany

[73] Assignee: Heraeus Christ GmbH, Osterode, Fed. Rep. of Germany

[21] Appl. No.: 40,120

[22] Filed: May 18, 1979

[30] Foreign Application Priority Data

Jun. 1, 1978 [DE] Fed. Rep. of Germany ....... 2824045

[51] Int. Cl.³ .............................................. B04B 9/02
[52] U.S. Cl. .................................................... 233/24
[58] Field of Search ................... 233/1 R, 1 B, 1 C, 7, 233/23 R, 23 A, 24, 25, 26, 14 R, 27, 16, 3, 6, 1 D

[56] References Cited

U.S. PATENT DOCUMENTS

| | | | |
|---|---|---|---|
| 2,682,992 | 7/1954 | Heckendorf | 233/20 R |
| 2,908,907 | 10/1959 | Danielsson | 233/1 R |
| 3,403,848 | 10/1968 | Windsor | 233/7 |
| 3,424,375 | 1/1969 | Maurer | 233/7 |
| 3,494,542 | 2/1970 | Craig | 233/7 |

Primary Examiner—Robert W. Jenkins
Attorney, Agent, or Firm—Frishauf, Holtz, Goodman & Woodward

[57] ABSTRACT

To gently stop a centrifuge, particularly for use in blood transfusion procedures including plasmapheresis, a centrifuge motor is first braked by reverse current application with high braking torque, to reduce the speed thereof from operating speed to less than 1000 rpm, for example between 800 to 500 rpm; and then braked under dynamic braking conditions, preferably under continuously variable torque conditions, until it is about stopped, for example at close to 50 rpm, and then permit it to coast to a stop. The braking is effected gently and can be achieved from a nominal speed of 6000 rpm to stopped condition in about 2 minutes, thus permitting blood centrifuging for plasmapheresis in about 8 minutes.

15 Claims, 1 Drawing Figure

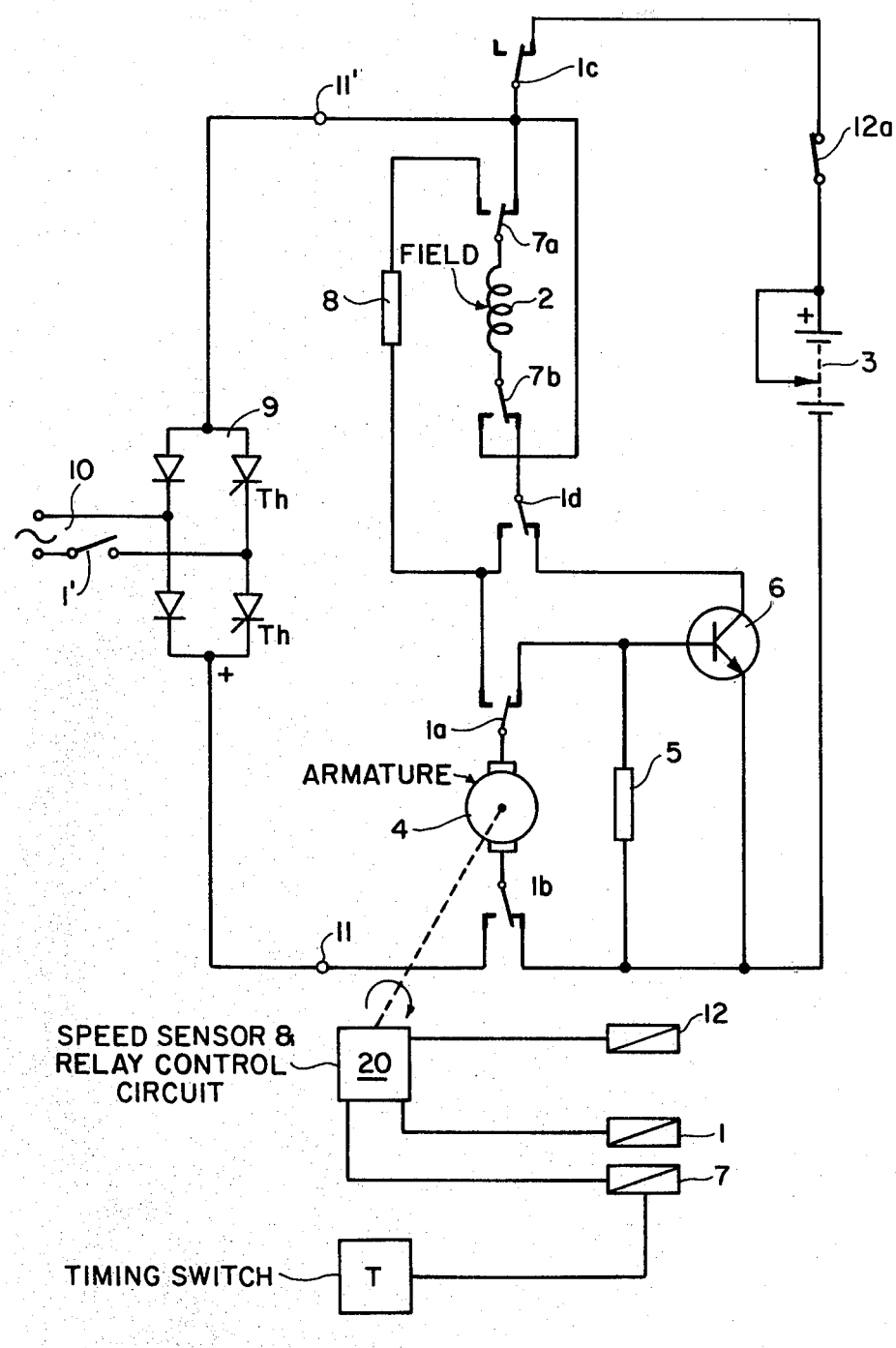

METHOD OF GENTLY CONTROLLING BRAKING OF A CENTRIFUGE, AND BRAKING SYSTEM

The present invention relates to centrifuges, especially for biological application, for example for use in blood separation, and more particularly to controlled braking of the centrifuge.

BACKGROUND AND PRIOR ART

Controlled braking of centrifuges is known, see, for example, German Disclosure Document DE-OS 26 40 745. Braking arrangements which are customary in various types of centrifuges, for example the type used for blood separation, require about 14 minutes after de-energization of the centrifuge motor. The customary blood separation small centrifuges operate at a speed of about 6000 rpm. It has not in the past been necessary to stop centrifuges, after the centrifuging operation, at a specific, short time, and the actual time required to brake the centrifuge was not material. New methods to obtain blood plasma, however, make it desirable to rapidly stop centrifuging operation. The method of blood separation to obtain blood plasma known as plasmapheresis provides return to the blood donor of the remaining components of the blood, particularly erythrocytes immediately after separation by centrifuging of the donated blood. The blood donor waits while the centrifuge operates adjacent the donor's bed or litter. It is thus of increasing importance to reduce the waiting time of the donor and any gain in time after centrifuging is complete and until the centrifuge is stopped, thus terminating the plasma separation, is of substantial advantage.

THE INVENTION

It is an object to decrease the braking time of a centrifuge rotor, and particularly of a centrifuge rotor for use in blood separation, to permit reduction of the overall time required for plasmapheresis.

Briefly, in accordance with the invention, the centrifuge rotor is braked in two sequential braking phases: In a first braking phase, a high braking torque is applied until the rotational speed of the rotor has reached a first predetermined value, which is substantially below the operating speed of the centrifuge, for example bringing the speed of the centrifuge from several thousand rpm to a speed below 1000 rpm, e.g. 800 to 500 rpm. A second braking phase is then commenced which brakes the centrifuge at a lower braking torque and reduces the speed of the centrifuge to just above zero, for example to about 50 rpm. The second braking phase is then terminated and the rotor permitted to coast to a stop.

Centrifuges of the type to which the invention relates are operated by electric motors. The first braking phase is carried out by applying reverse current to the motor; during the second braking phase, dynamic braking, that is, operating the motor as a generator and dissipating the energy in a resistor is used. Switch-over between the respective systems, that is, from one braking phase to the other, is automatic, controlled, for example, by a speed sensor.

The method and apparatus have the advantage that the centrifuge is brought to stopped condition from its high rotational speed within a short period of time, in an illustrative example in about 2 minutes. This permits a substantial reduction in the overall time for the plasmapheresis; a typical centrifuging time is about 6 minutes, to which a stopping time of about 2 minutes has to be added, which contrasts with the additional stopping time of 14 minutes of centrifuges which do not have a braking system. Additionally, braking is gentle, without disturbing the separation of the centrifuged components.

DRAWING

Illustrating a preferred example, wherein the single FIGURE illustrates, in highly schematic form, a braking system for a centrifuge in accordance with the present invention, from which all elements and apparatus components not necessary for an understanding of the present invention have been omitted; specifically, the customary energization terminals, switching controls, and the like, timing circuits to determine centrifuging time, speed control circuits to determine centrifuging speed and the like, have been omitted.

A centrifuge rotor—not shown—is driven by a d-c electric motor, of which in the drawing the field winding 2 and the armature are shown schematically. Both the field winding current supply as well as the armature current supply, and switching of the respective braking networks, is controlled by relay terminals. Three relays 1, 7 and 12 have respective relay contacts 1a, 1b, 1c, 1d, 1' and 7a, 7b, 12a. A variable voltage source 3 is provided, to supply current to the field 2 upon dynamic braking; the variable voltage source 3 can be formed either by a separate battery or, for example, by a voltage divider with variable division ratio, for example including a potentiometer, connected to the direct current supply terminals 11, 11' from which the motor having armature 4 and field 2 is energized. A dynamic braking resistor 5 is connected to relay terminals 1a, 1b to be connectable in parallel with the armature 4 of the motor. It bridges the base-emitter junction of a transistor 6, the collector of which is connected to one terminal of relay switch contact 1d. A speed sensor and relay control circuit 20 is connected to the armature. Speed sensor and relay control circuit 20 may include, for example, a centrifugal switching system which, when the speed of the armature driving the centrifuge drops to a first predetermined level initiates a first switching function and, when it drops to a second predetermined level, initiates a second switching function. The speed sensing circuit may also be formed by a non-contacting type of speed sensor, for example by coupling a star-wheel, or the like, with the armature, and magnetically coupled to a pick-up coil which provides an output signal which, after wave shaping, for example, provides pulses which have a repetition rate depending on the speed of rotation of armature 4. Alternating current is supplied for energization from a source 10, and rectified in a thyristor rectifier 9 which can be connected in customary form to provide direct current output to terminals 11, 11'. The thyristor bridge circuit 9 provides energization for the operation of the centrifuge as well as for reverse current braking. A resistor 8 is provided to enable reverse current braking as will appear. The variable voltage source 3 is variable, in accordance with any well known circuit, to permit adjustment of the dynamically generated current during braking when the motor operates as a dynamic brake. The speed sensor and relay control circuit 20 may have separate speed sensing elements, initiating the respective switching function in dependence at the respective speed, or can have a single speed sensing element which becomes effective or is energized at respective speed levels; if a centrifugal speed sensor, for example, it may have a plurality of contacts which are operated when the centrifugal element reaches predetermined positions in accordance with the respective speed; if an inductive sensor, for example, then specific speed levels can be detected by tuned filters connected to the output of the inductive sensor.

Operation, and description of method:

(1)—Centrifuging: a-c power is applied at terminals 10 to the thyristor bridge 9. Relay 1 is energized by a suitable relay control circuit (not shown) causing the relay contacts 1a . . . 1d to switch over from the position shown in the FIGURE to the left terminal. This establishes the following motor energization circuit: bridge 9—terminal 11—bridge contact 1b—armature 4—relay contact 1a—relay contact 1b—motor field 2—relay contact 7a—terminal 11'—bridge 9. The motor is energized and the armature will rotate.

(2)—Braking:

(a) first braking phase using reverse current braking: After a suitable centrifuging time, for example as determined by a timing switch T, relay 7 will change over so that its contacts 7a, 7b will change to the left in the figure. This establishes the following circuit: thyristor bridge 9—terminal 11—relay terminal 1b—armature 4—relay terminal 1a—braking resistor 8—relay contact 7a—field coil 2—relay contact 7b—terminal 11'—thyristor bridge 9. As can be seen, current will now flow to the field in reverse direction with respect to the previous current direction, whereas the armature current direction has remained the same. The reverse field will tend to stop the armature and reverse its direction of rotation. Consequently, the speed of the armature is rapidly reduced, that is, the motor is braked. Resistor 8 dissipates the braking energy.

As the motor speed drops, the speed sensor and relay control circuit 20 will sense the change in speed. When the speed sensor 20 determines that a first predetermined speed value has been reached, the speed sensor and relay control circuit 20 will: (1) disconnect current supply from the bridge 9, for example by opening a switch contact 1' in the supply 10 to the thyristor bridge 9, and, further, permit the relay contacts 1a . . . 1d to revert to the position shown in the FIGURE; and (2) upon sensing this first speed level, the relay 7 is de-energized, causing the relay terminal 7a, 7b to revert to the position shown in the FIGURE. This initiates the second braking phase.

(b) Second braking phase—dynamic braking: The circuit condition during the second braking phase will be thus: The relay 1 with the contacts 1', 1a . . . 1d, as well as relay 7 with the contacts 7a, 7b, will be in the position shown in the drawing. This establishes a supply circuit to the field 2 from the variable voltage source 3 as follows: Source 3—relays 12a—relay terminal 1c—relay terminal 7a—field 2—relay terminal 7b—relay terminal 1d—emitter-collector path of transistor 6—source 3. Since the rotor of the rotating armature 4 is still rotating, a voltage will be generated at the brushes thereof, that is, at the relay terminals 1a, 1b. This voltage will cause current to flow through the dynamic braking resistor 5. The voltage across the armature, that is, across the dynamic braking resistor 5, controls the voltage at the base-emitter junction of transistor 6. The conduction of the transistor 6 thus will be directly influenced by the voltage across the armature 4 and hence the current which flows through field coil 2 will be controlled by the dropping voltage of the armature 4 as the armature decelerates. This causes gentle, controlled braking of the motor until it is almost stopped or possibly even stopped. It is possible to additionally control the braking current or braking torque in the second phase by, for example, manually changing the voltage of the source 3 which causes field current to flow through field 2 and the transistor 6.

Example: A small centrifuge, of the type used for blood centrifuging in blood transfusion applications, had an aluminum rotor with an outer diameter of about 30 cm, and a nominal operating speed of 6000 rpm. It is used for plasmapheresis, requiring about 6 minutes of centrifuging time. This rotor had a mass inertia moment of 26,200 Nm. During the first braking phase, its speed was reduced from its nominal operating speed of about 6000 rpm to about 800 rpm in a time period of about 45 seconds. At the speed of 800 rpm, the mass inertia moment was 466 Nm. In the second braking phase, the speed was further reduced to about 70 rpm from 800 rpm, corresponding to a reduction in mass inertia moment to about 3.6 Nm. The time for the second braking phase again was about 45 seconds. When the low, minimum braking speed was reached, in the example about 70 rpm, current supply from source 3 was interrupted, for example by opening of a relay terminal 12a, permitting the rotor to coast to a stop. The free coasting time was about 30 seconds. The overall time which was necessary for plasmapheresis, thus, was dropped from previously 20 minutes to about 8 minutes. The braking effort in the first braking phase was 572 watts; in the second braking phase 10.3 watts.

In the example above, the resistors used in the respective braking phases were of different values; resistor 5 had about 5 ohms, resistor 8 about 25 ohms.

Various changes and modifications may be made and the values given above are illustrative of a suitable and currently preferred embodiment. Gentle braking is achieved, however, by utilizing two braking phases in which, during the first braking phase, a high braking torque or braking effort is applied, preferably by a reverse field, and in a subsequent second phase, a substantially lower braking torque or braking effort, for example under dynamic braking conditions with continuously decreasing braking torque as the speed of the rotor of the centrifuge is reduced.

We claim:

1. Method of controlled, gentle braking of a centrifuge comprising the sequential steps of initiating and maintaining a first braking phase in which the centrifuge is braked by application of a first, higher braking torque until the rotational speed thereof has reached a first predetermined value which is substantially below the operating speed of the centrifuge;

then initiating and maintaining a second braking phase during which the centrifuge is braked by applying a second and lower braking torque until the rotational speed thereof has reached a second predetermined value which is substantially below said first speed value;

and then discontinuing application of the braking torque to the centrifuge.

2. Method according to claim 1, wherein the step of discontinuing application of the braking torque to the centrifuge after the second braking phase is carried out at a second speed value which is above stopped speed of the centrifuge, but substantially below said first speed value;

and permitting the centrifuge rotor to coast to a stop.

3. Method according to claim 2, wherein the operating speed of the centrifuge is in the order of several thousand rpm;
said first predetermined speed value is between 800 to 500 rpm whereby the rotor is decelerated in the first phase from said nominal speed of several thousand rpm to the speed of about 800 to 500 rpm;
and wherein said second predetermined speed value has a minimum of about 50 rpm, wherein, in the second phase, the rotor is decelerated from between about 800 to 500 rpm to at least about 50 rpm.

4. Method according to claim 1, wherein said first braking phase includes the step of applying a braking torque which is essentially constant throughout said first braking phase.

5. Method according to claim 1, wherein said second braking phase includes the step of applying a second braking torque which has a torque level predetermined at the initiation or beginning of the second braking phase.

6. Method according to claim 5, wherein said first braking phase includes the step of applying a braking torque which is essentially constant throughout said first braking phase.

7. Method according to claim 1, wherein said second braking phase includes the step of applying a braking torque which is continuously variable during deceleration of the rotor under braking, and decreases with decreasing speed of the rotor.

8. Method according to claim 7, wherein said first braking phase includes the step of applying a braking torque which is essentially constant throughout said first braking phase.

9. In a centrifuge having an electrical drive motor (2, 4),
a dynamic braking system for gentle, controlled braking thereof which comprises, in accordance with the invention,
a first braking circuit including a reverse current circuit applying current to the centrifuge motor in a direction counter the direction of current flow to the motor during centrifuging;
a second braking circuit including a dissipating resistor (5) for dynamic braking of the motor;
switching means (1, 7) selectively energizing the respective braking circuit;
and speed responsive means (20) connected to and controlling the switching means to control, selectively, connection of said first circuit during a first braking phase in which the centrifuge is braked by application of a first, higher braking torque until the rotational speed thereof has reached a first, predetermined value which is substantially below the operating speed of the centrifuge, as sensed by the speed responsive means,
and then connecting said second braking circuit during a second braking phase during which the centrifuge is braked by application of a second, and lower braking torque until the rotational speed thereof has reached a second, predetermined value which is substantially below said first speed value, as sensed by said speed responsive means, and then disconnecting said second braking circuit.

10. Centrifuge dynamic braking system according to claim 9, wherein the first braking circuit includes a braking resistor (8);
and wherein the braking resistor (8) and the dissipating resistor (5) are of different values to provide for different braking efforts being applied to the centrifuge during the respective braking phases.

11. Centrifuge dynamic braking system according to claim 9, further including a variable voltage source (3) connectable in circuit with said second braking circuit to provide for variable dynamic braking during the braking phase.

12. Centrifuge dynamic braking system according to claim 9, further comprising a thyristor bridge circuit (9) supplying power to the centrifuge during centrifuging operation;
and wherein the first braking circuit includes changeover switches (1; 1a . . . 1d) applying power from said bridge circuit to the centrifuge in reverse direction during the first braking phase to provide for reverse current braking of the centrifuge.

13. Centrifuge dynamic braking system according to claim 9, wherein the second braking circuit includes a variable resistance element (6), and circuit means (5) controlling the resistance of the variable resistance element in accordance with the counter emf generated by the armature of the centrifuge motor during the second braking phase,
the variable resistance element controlling current to the field of the centrifuge motor in a direction to decrease the field current upon deceleration of the motor to provide for gentle braking during the second braking phase.

14. Centrifuge dynamic braking system according to claim 9, wherein the switching means additionally includes a switch (12, 12a) de-energizing both the first and the second braking circuits at the second predetermined speed value which is above stopped or zero speed, as sensed by the speed responsive means (20) to thereby permit the centrifuge to coast to a stop from said second predetermined speed.

15. Centrifuge dynamic braking system according to claim 9, wherein said first braking circuit is effective and connected by said switching means (1) in a speed range between operating speed and about 800 to 500 rpm, the second braking circuit is effective and connected by said switching means (7) in a speed range of from between 800 to 500 rpm to about a minimum of 50 rpm;
and wherein said switching means (12, 12a) disconnects both said first and second braking circuits after termination of the second braking phase to permit the centrifuge to gently coast to a stop.

* * * * *